US006468941B1

(12) United States Patent
Bortun et al.

(10) Patent No.: US 6,468,941 B1
(45) Date of Patent: Oct. 22, 2002

(54) NIOBIUM CONTAINING ZIRCONIUM-CERIUM BASED SOILD SOLUTIONS

(75) Inventors: Anatoly I. Bortun; John Gerard Nunan, both of Tulsa, OK (US)

(73) Assignee: Delphi Technologies, Inc., Troy, MI (US)

( * ) Notice: Subject to any disclaimer, the term of this patent is extended or adjusted under 35 U.S.C. 154(b) by 73 days.

(21) Appl. No.: 09/690,511

(22) Filed: Oct. 17, 2000

(51) Int. Cl.[7] .............................. B01J 21/00; B01J 23/16
(52) U.S. Cl. ...................... 502/300; 502/302; 502/303; 502/304; 502/325; 502/340; 502/349
(58) Field of Search ............................... 502/300, 302, 502/303, 304, 325, 340, 349

(56) References Cited

U.S. PATENT DOCUMENTS

| 4,581,343 A | | 4/1986 | Blanchard et al. | 502/241 |
|---|---|---|---|---|
| 5,248,650 A | * | 9/1993 | Sekiba et al. | 502/303 |
| 5,571,492 A | * | 11/1996 | Yao et al. | 423/263 |
| 5,580,536 A | * | 12/1996 | Yao et al. | 423/263 |
| 5,762,894 A | * | 6/1998 | Takatori et al. | 423/263 |
| 5,837,642 A | * | 11/1998 | Tanaka et al. | 502/304 |
| 5,888,464 A | * | 3/1999 | Wu et al. | 423/213.5 |
| 5,898,014 A | * | 4/1999 | Wu et al. | 502/302 |
| 6,037,305 A | * | 3/2000 | Cuif et al. | 502/304 |
| 6,139,814 A | * | 10/2000 | Shigapov et al. | 423/592 |
| 6,171,572 B1 | * | 1/2001 | Aozasa | 423/593 |
| 6,180,075 B1 | * | 1/2001 | Lindner et al. | 423/213.2 |
| 6,248,688 B1 | * | 6/2001 | Wu et al. | 502/302 |
| 6,261,989 B1 | * | 7/2001 | Tanaka et al. | 502/217 |
| 6,348,430 B1 | * | 2/2002 | Lindner et al. | 502/304 |

FOREIGN PATENT DOCUMENTS

| EP | 0 525 677 A1 | 3/1993 |
|---|---|---|
| EP | 0 525 677 B1 | 12/1995 |
| JP | 62071536 A | 4/1997 |
| WO | WO 96/21506 | 7/1996 |

OTHER PUBLICATIONS

"Electrical Conduction in Nb2O2–Doped Cerium Dioxide", I.K. Naik and T.Y. Tien, J. Electrochem. Soc.: Electrochemical Science and Technology, Apr. 1979, pp. 562–566.

"Studies of the cerium–metal–oxygen–hydrogen system (metal=Cu, Ni)", C. Lamonier et al., Catalysis Today 50 (1999), pp. 247–259.

"Phase Stability and Physical Properties of Cubic and Tetragonal ZrO2 in the system ZrO2–Y2O3–Ta2O5", Dao–Joon Kim et al., J. Am Ceram, Soc., 74[12] (1991) pp. 3061–3065.

"Partial oxidation of methane to syngas over Ni/MgO, Ni/CaO and Ni/CeO2", S. Tang, J. Lin and K.L. Tan, Catalysis Letters 51(1998) pp. 169–175.

"Thermal Analysis of Transition Metal and Rare Earth Oxide System–Gas Interactions By a Solid Electrolyte–Based Coulometric", K. Teske et al., Journal of Thermal Analysis, Vo. 49 (1997) p.12–11–1220.

"Nanophase catalytic oxides: I. Synthesis of doped cerium oxides as oxygen storage promotors", Yu Zhang et al., Applied Catalysis B: Environmental 6 (1995), pp. 325–337.

"Effect of cerium on the mobility of oxygen on manganese oxides", S. Imamura et al.; Applied Catalysis A: General 142 (1996), pp. 279–288.

"Catalytic combustion of hydrocarbons with Mn and Cu–doped ceria–zirconia solid solutions", Daniela Terribile et al., Catalysis Today 47 (1999). pp. 133–140.

* cited by examiner

*Primary Examiner*—Stanley S. Silverman
*Assistant Examiner*—Timothy C. Vanoy
(74) *Attorney, Agent, or Firm*—Vincent A. Cichosz

(57) ABSTRACT

The present invention relates to high oxygen ion conducting/oxygen storage (OIC/OS) materials, a catalyst employing the OIC/OS materials, and a method for converting hydrocarbons, carbon monoxide and nitrogen oxides using the catalyst. The OIC/OS materials have significantly higher oxygen storage capacity than that predicted based on Ce content due to the unexpected high and facile redox activity of the added niobium. These materials are further characterized by having a tetragonal crystalline structure under oxidizing conditions (in air) up to about 1,200° C. and a cubic crystalline structure in reducing conditions (5% hydrogen) up to about 1,000° C. for 24 hours. These materials comprise, based upon 100 mole % of the metal component in the material, up to about 95 mole % zirconium, up to about 50 mole % cerium, about 0.5 to about 15 mole % rare earth metal(s), alkaline earth metal(s) or a combination thereof, and about 0.5 to about 15 mole % niobium.

7 Claims, 10 Drawing Sheets

US 6,468,941 B1

NIOBIUM CONTAINING ZIRCONIUM-CERIUM BASED SOILD SOLUTIONS

TECHNICAL FIELD

The present invention relates to an Oxygen Ion Conducting/Oxygen Storage (OIC/OS) material, and especially relates to an OIC/OS material having niobium (Nb) as part of the crystal structure and which exhibits higher OS capacity and more facile OS properties compared to materials of similar Ce-content. This new material further exhibits a unique property of reversible crystal structure changes upon calcination in oxidizing and reducing environments.

BACKGROUND OF THE INVENTION

It is known that ceria ($CeO_2$) plays a number of important roles in automotive three-way conversion (TWC) catalysts for the removal of post-combustion pollutants. Among these are: stabilization of precious metal (PM) dispersion, alumina support stabilization, promotion of the water gas shift (WGS) reaction, promotion of the carbon monoxide (CO)+ oxygen ($O_2$) reaction to give carbon dioxide ($CO_2$); the nitric oxide (NO)+CO reactions to give $CO_2$ and $N_2$, and finally oxygen storage (OS) properties. The oxygen storage ability of $CeO_2$ arises due to the facile nature of the $Ce^{4+}/Ce^{3+}$ redox reaction in typical exhaust gas mixtures: the reduction of $CeO_2$ to cerous oxide ($Ce_2O_3$) provides extra oxygen under fuel rich conditions and oxidation of $Ce_2O_3$ to $CeO_2$ builds up an oxygen reserve under fuel lean conditions. Such a facile oxygen storage—oxygen release ability is important for controlling the ratio of oxidants (air(A)) and reductants (fuel(F)) (A/F ratio) in the exhaust, so that CO and hydrocarbons (HCs) can be oxidized simultaneously with the reduction of nitrogen oxides ($NO_x$). The A/F ratio is defined as the weight of air divided by the weight of fuel. For a typical gasoline fuel, an A/F ratio of 14.5–14.7 gives an exhaust composition where there are enough oxidants ($O_2+NO_x$) to completely convert the unburnt HCs and CO in the exhaust to carbon dioxide ($CO_2$), water ($H_2O$), and nitrogen ($N_2$). This is referred to as stoichiometric operation and typically occurs during a cruise or idle operation of the vehicle. During accelerations exhaust compositions with excess HCs and CO are generated (rich mixtures with A/F values less than the stoichiometric value) and during deceleration, compositions with excess oxidants are generated (lean mixtures with A/F values greater than the stoichiometric value). The facile release and consumption of oxygen is important during driving conditions that generate these A/F transients away from stoichiometry so as to prevent the break through of pollutants such as HCs, CO and $NO_x$. Catalysts that are used in these applications are referred to as three-way-conversion (TWC) catalysts as they convert the three main pollutants (HCs, CO and NOx) to innocuous products.

In older TWC catalysts, pure $CeO_2$ was used as the oxygen storage component. However, in the older TWC catalysts, because of poor thermal stability, a large loss of oxygen storage capacity occurs above 900–1,000° C. Modem TWC catalysts require more durable and facile OS characteristics. This has resulted in the replacement of pure $CeO_2$ with solid solutions based on Ce—Zr. Unlike composite metal oxides in which a solid solution is not formed between all the components in the mixture of metallic and oxygen species present, these solid solutions typically refer to a single, substantially homogeneous, metal oxide crystallite or crystallites characterized in that the oxygen atoms in the crystal structure are attached to metal ions of more than one metallic species. These type of materials are further characterized by having a single crystal structure and are referred to as single phase materials of tetragonal or cubic crystal structure. Lower valent rare earth or alkaline earth dopants can also be present in these newer materials. These type materials have the following general properties:

a) They have much higher OS capacity than pure $CeO_2$. This arises, as in pure $CeO_2$, only $Ce^{4+}$ ions at the surface of the crystallites are redox active. However, for Ce—Zr based solid solutions bulk Ce is also redox active in typical exhaust gas compositions and reduction of bulk Ce results in oxygen migration to the crystallite surface where it can be used to oxidize HCs or CO. Thus, these materials are referred to here as OIC/OS type materials as their function involves both oxygen storage and oxygen mobility characteristics. These differences between pure $CeO_2$ and Ce—Zr based solid solutions are illustrated in FIGS. 1 and 2.

b) A further advantage of Ce—Zr based solid solutions is that they are thermally more stable than pure $CeO_2$. This results, after aging, in slower sintering rates or particle growth rates and higher aged OS capacity.

c) It has also been found that increasing the Zr content in Ce—Zr solid solutions results in a lowering of the cerium reduction energy in going from $Ce^{4+}$ to $Ce^{3+}$ and at the same time in a decrease in the activation energy for oxygen ion mobility within the lattice. This is illustrated in FIGS. 3 and 4 from a theoretical analysis of binary Ce—Zr solid solutions by Balducci et al., J. Phys. Chem., B., Vol. 101, No 10, P. 1750, 1997. In FIG. 3 it is further observed that the presence of lower valent ions that introduce oxygen vacancies further lower the reduction energies from $Ce^{4+}$ to $Ce^{3+}$. (Line A is cerium reduction energy for isolated $Ce^{3+}$ and $V_O$vacancies; B is cerium reduction energy for $Ce^{3+}$—$V_O$clusters; and C is cerium reduction energy for $Ce^{3+}$—$V_O$—$Ce^{3+}$ clusters.)

d) A further advantage of Zr-rich solid solutions is that after severe aging (greater than 1,000° C.), all the Ce in the solid solution remains accessible for oxygen storage. In contrast, only a fraction of the Ce is available for OS in intermediate Zr-content compositions. This is illustrated in FIG. 5, curve 55, where the "available" OS for aged (greater than 1,000° C.) Ce—Zr solid solutions of varying Zr content are plotted. The OS capacity was measured using Temperature Programmed Reduction (TPR) analysis. For this measurement the aged sample is exposed to a 5%$H_2$/95%Ar mixture and the rate of $H_2$ uptake is measured as a function of temperature. The fraction of Ce reduced is measured based on the following reaction:

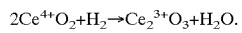

$$2Ce^{4+}O_2 + H_2 \rightarrow Ce_2^{3+}O_3 + H_2O.$$

The maximum available OS based on Ce content is presented as Curve 51. It is seen that Curves 51 and 55 (maximum OS based on Ce content and "available" OS) coincide only in a narrow and low range of Ce contents from 0–20 mole % Ce. An increase in Ce content above 20 mole % does not result in a corresponding increase in "available" OS higher than 0.45 millimoles per gram (mmoles/g). The consequence of this limited OS availability is that in severely aged intermediate Zr-content or Ce-rich solid solutions, only part of the Ce is redox active and capable of participating in redox reactions, whereas the rest of the Ce behaves as a structure forming element. This is true for both binary Ce—Zr mixtures and for multi-component mixtures with other rare earth and alkaline earth dopants present.

Thus, the formation of high Zr-content Ce—Zr solid solutions has some disadvantages. One clear disadvantage is the continuous drop in OSC capacity with increased Zr content even though these materials tend to have the best thermal stability and the most facile OS properties.

What is needed in the art are OIC/OS materials having high oxygen storage capacity while maintaining or even improving upon the thermal stability and facile nature of the redox function of Zr-rich compositions.

SUMMARY OF THE INVENTION

The present invention comprises an OIC/OS material, a catalyst comprising the OIC/OS material, and a method for converting hydrocarbons, carbon monoxide and nitrogen oxides using the catalyst. This OIC/OS material comprises: up to about 95 mole percent (mole %) zirconium; about 0.5 to about 40 mole % cerium; about 0.5 to about 15 mole % R, wherein R is a rare earth metal, an alkaline earth metal, or a combination comprising at least one of these metals; and about 0.5 to 15 mole % niobium, based upon the 100 mole % metal component in the material. The invention further comprises the reaction product of about 0.5 to about 95 mole percent (mole %) zirconium; about 0.5 to about 40 mole % cerium; about 0.5 to about 15 mole % R; and about 0.5 to about 15 mole % niobium.

The catalyst comprises: an OIC/OS material having about 0.5 to about 95 mole percent (mole %) zirconium, about 0.5 to about 40 mole % cerium, about 0.5 to about 15 mole % yttrium or optionally other earth metal; and about 0.5 to about 15 mole % niobium; a noble metal component; and a porous support wherein said zirconium, cerium, R, precious metal and porous support are deposited on a substrate.

The method for converting hydrocarbons, carbon monoxide and nitrogen oxides in an exhaust stream, comprising: using a catalyst comprising an OIC/OS material having about 0.5 to about 95 mole % zirconium, about 0.5 to about 40 mole % cerium, about 0.5 to about 15 mole % R; and about 0.5 to about 15 mole % niobium, a precious metal component, and a porous support, deposited on a substrate; exposing the exhaust stream to the catalyst; and converting hydrocarbons, carbon monoxide and nitrogen oxides in the exhaust stream to carbon dioxide, water and nitrogen.

The above described and other features of the present invention will be appreciated and understood by those skilled in the art from the following detailed description, drawings, and appended claims.

BRIEF DESCRIPTION OF THE DRAWINGS

The accompanying drawings are meant to be exemplary, not limiting.

DESCRIPTION OF THE PREFERRED EMBODIMENT

Figure 1:
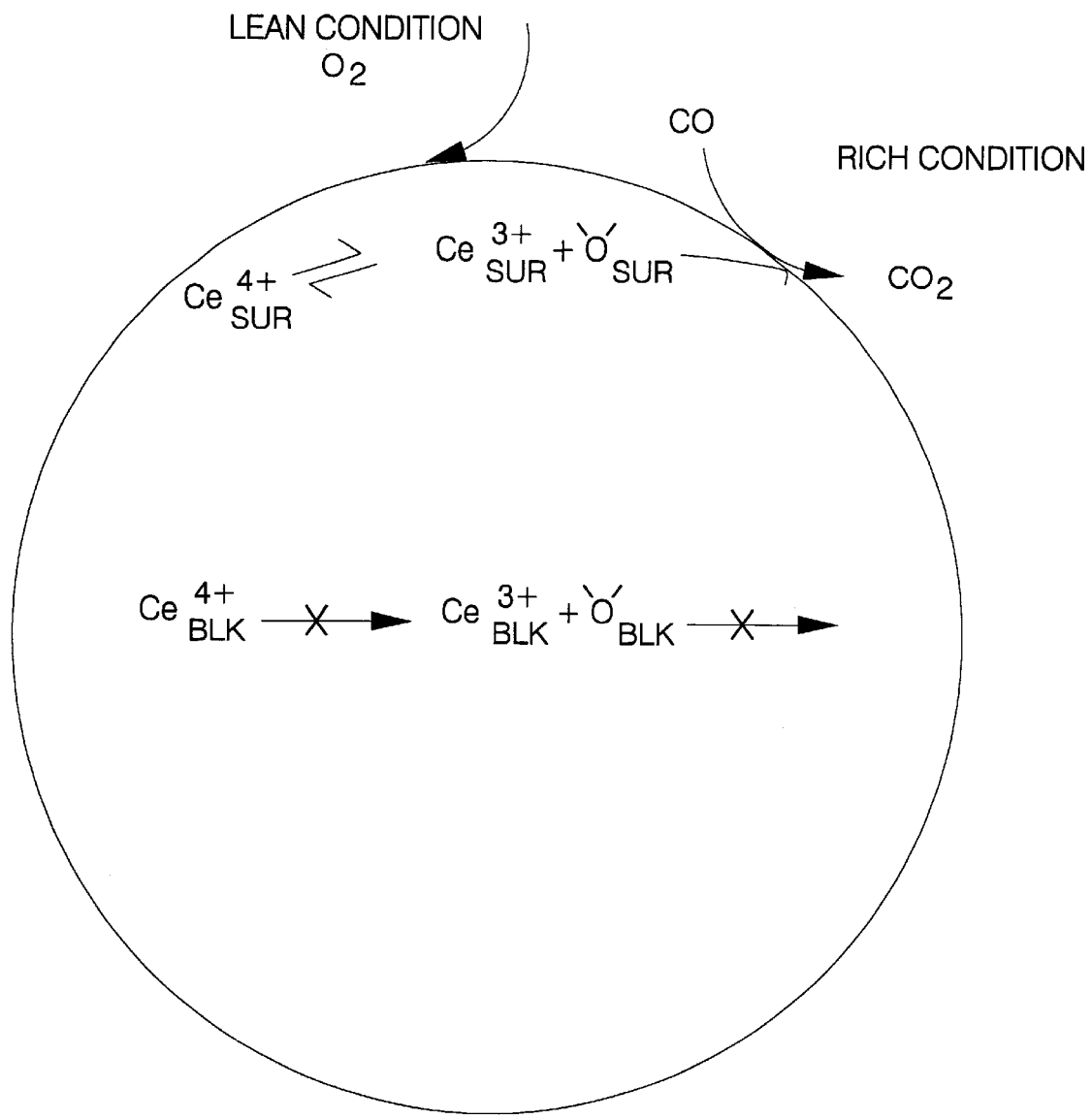
FIGS. 1 and 2 illustrate the fact that when binary or ternary solid solutions are formed between $CeO_2$, $ZrO_2$, and optionally lower valent dopants, bulk oxygen becomes available for oxidation at the crystal surfaces as a result of bulk $Ce^{4+}$ reduction followed by oxygen migration to the surface of the solid solution crystallites.
Figure 2:
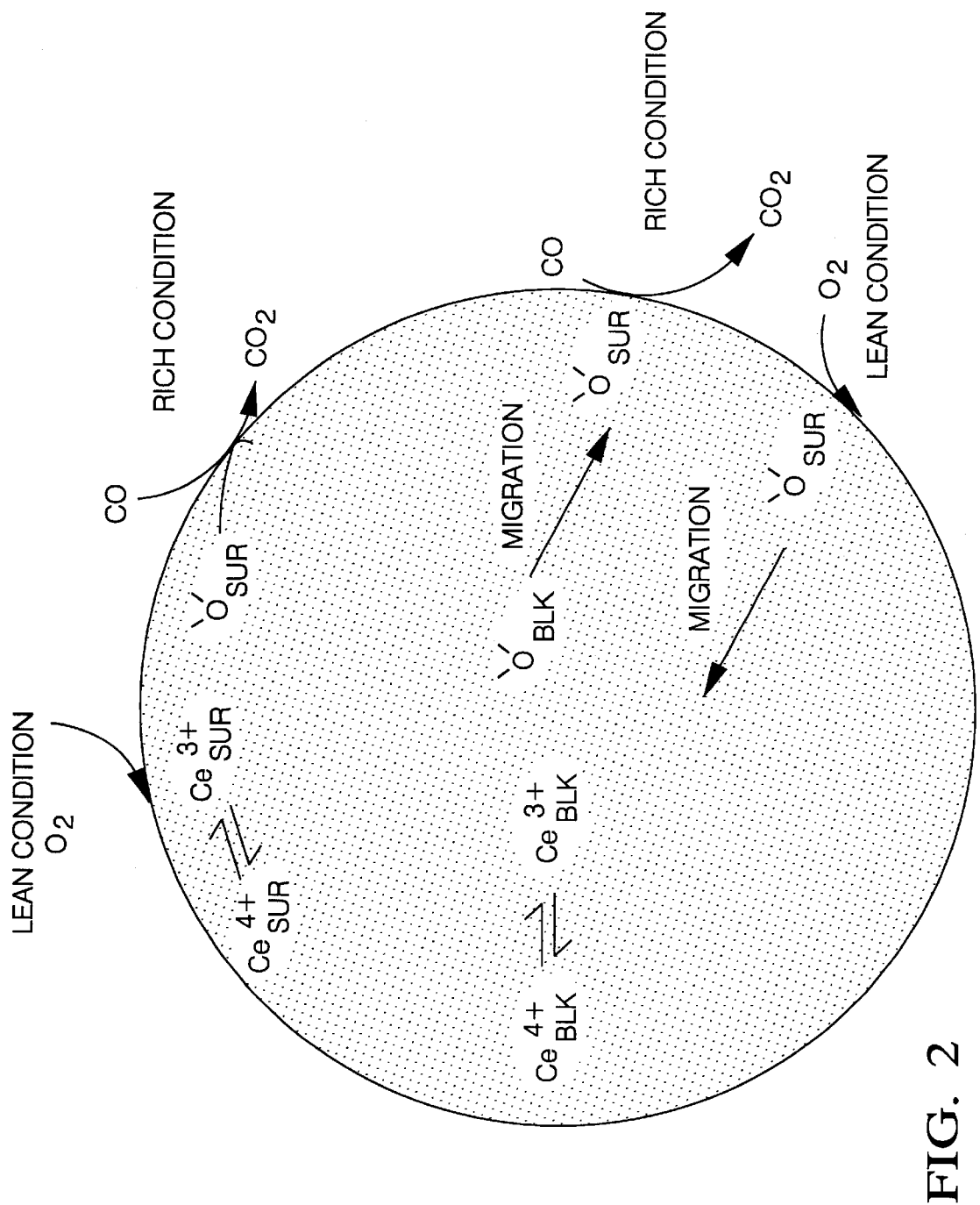
Figure 3:
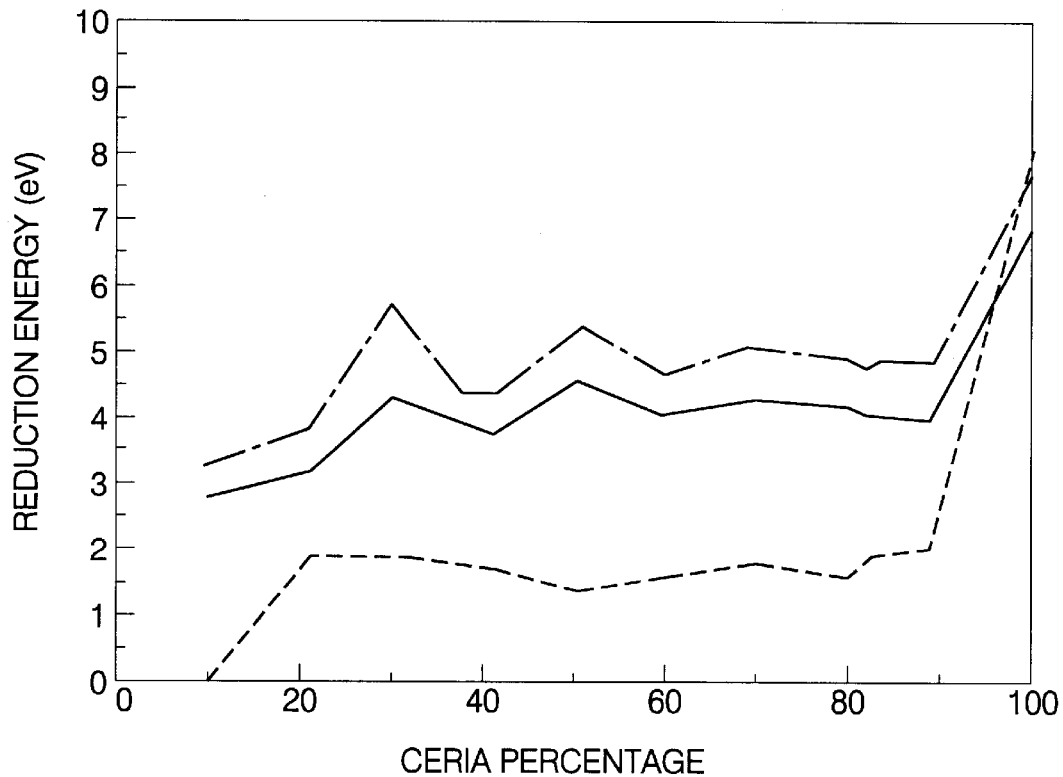
FIGS. 3 and 4 are graphical representations illustrating that Zr-rich compositions possess lower activation energies for 'O' mobility and lower energies for $Ce^{4+}$ reduction.
Figure 4:
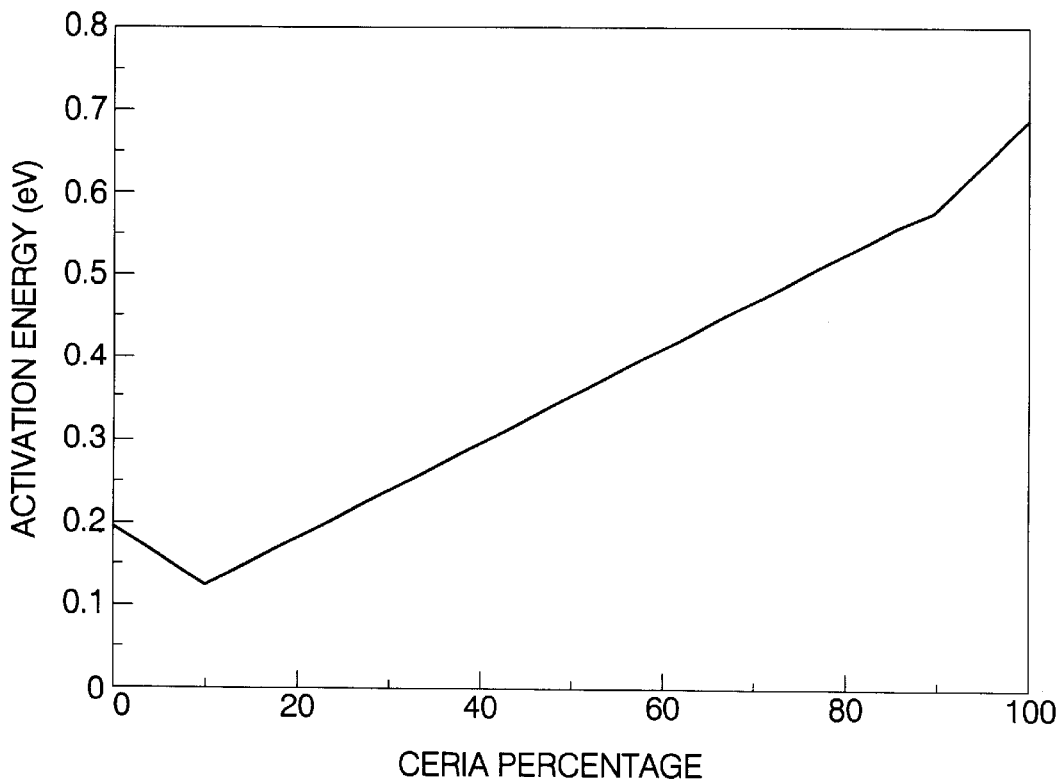
Figure 5:
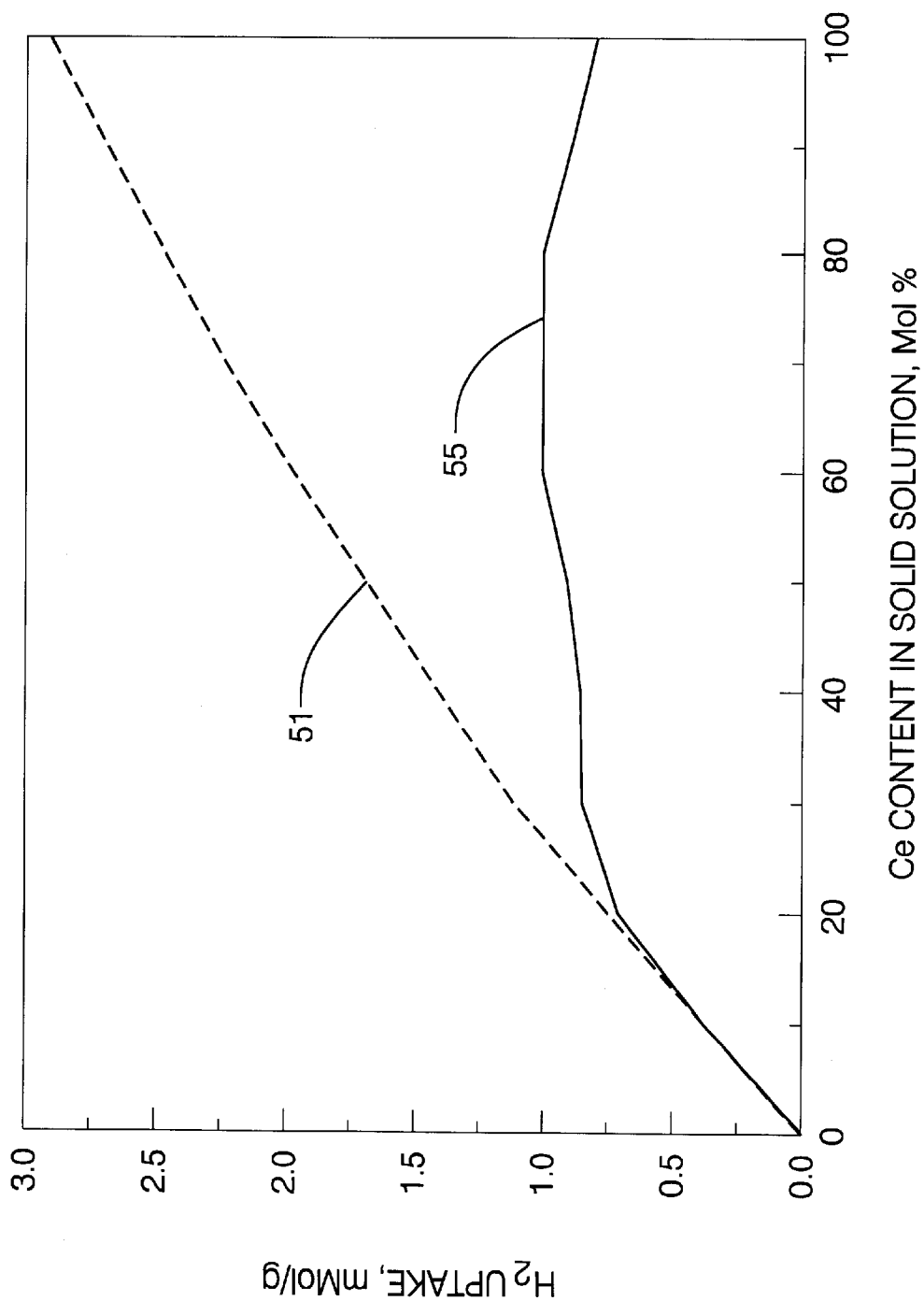
FIG. 5 is a plot of $H_2$ uptake as a function of Ce content for greater than 1,000° C. aged binary Ce—Zr based solid solutions where the decreased fraction of Ce reduction above 20 mole % Ce content is demonstrated.

The present invention relates to thermally stable Ce—Zr—R—Nb, based solid solutions having high Zr and low Ce contents (i.e., less than about 40 mole % Ce), wherein "R" is a rare earth metal, alkaline earth metal or a combination comprising at least one of the foregoing metals, with yttrium, magnesium, calcium, strontium, lanthanum, praseodymium, neodymium, and combinations comprising at least one of these metals preferred, and yttrium especially preferred; and where the addition of low levels of Nb to the crystal structure increases the OS capacity and at the same time generates more facile OS properties while maintaining high thermal stability. The added OS capacity and increased facile nature of the OS function arises due to the presence of Nb when incorporated into the unique solid solution compositions. The oxides of Nb are potentially redox active due to the existence of the three different valent states i.e. $Nb^{5+}$, $Nb^{4+}$ and $Nb^{3+}$ oxides:

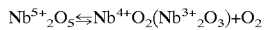

$$Nb^{5+}{}_2O_5 \leftrightarrows Nb^{4+}O_2(Nb^{3+}{}_2O_3) + O_2$$

However, $Nb^{5+}/Nb^{4+}$ and $Nb^{5+}/Nb^{3+}$ oxidation/reduction reactions are not facile and only occur at very high temperatures of 1,200–1,250° C. as compared to much lower temperatures for $CeO_2$ or Ce—Zr based solid solutions. However, when incorporated into the compositions, Nb itself becomes much more redox active and can be readily reduced to the $Nb^{4+}$ and $Nb^{3+}$ valent states when exposed to reducing gas mixtures. These lower valent states of Nb are not readily accessible under normal conditions but become so when Nb is incorporated into the crystal structures of the Ce,Zr,$RO_x$ compositions. Furthermore, mixtures of Nb with the individual oxides, sub-mixtures of oxides, or composite oxides of $CeO_2$, $ZrO_2$ and $Y_2O_3$ do not exhibit the much improved redox activity.

The compositions hereof are further characterized in that they exist as single phase (or single crystal structure) materials whereby the oxygens in the crystal structure are shared between the metal ions and have chemical formula reflecting the fact that they exist as single phase materials. The presence of the single phase is demonstrated by XRD analysis by showing the absence of peaks associated with oxides or composite oxides of the individual components. Thus, for the solid solution having the empirical formula $Zr_{0.65}Ce_{0.25}Nb_{0.075}Y_{0.075}O_2$ only a single tetragonal or cubic phase (depending on the sample pretreatment) is observed in XRD analysis. Phases associated with the oxides of the individual component oxides such as $Nb_2O_5$, $CeO_2$, $ZrO_2$, and $Y_2O_3$ are not detected and sub-mixtures of solid solution compositions such as $CeZrO_x$, $ZrYO_x$, $NbCeO_x$ or composite sub-oxide mixtures and so on are also not present. It is further found that the much enhanced redox properties of the full solid solution composition of Zr,Ce,Y, $NbO_x$ can not be predicted when the properties of the individual oxides or sub-mixtures of the solid solutions are measured.

The formation of the single phase solid solutions are not predicted based on the known chemical properties of the individual oxides used. Thus, attempts at doping $CeO_2$ with niobium have not been successful. This is explained by the fact that metal oxides having the cubic fluorite crystal structure have extremely low solubility for penta valent cations. The solubility of $Nb_2O_5$ in $CeO_2$ is experimentally found to be below 0.8 mole %. For tetragonal structures such as $ZrO_2$, very low solubility for $Nb^{5+}$ is also reported. This is because penta valent cations decrease the stability of both cubic fluorite and tetragonal polymorphs.

However, in the case of the CeZrR compositions, $Nb^{5+}$ is readily incorporated into the solid solution crystal structure These Nb-containing solid solutions are further characterized by having the unique ability to convert to and from a tetragonal structure and a cubic structure depending on the oxidizing and reducing power of their gaseous environments. The tetragonal structure is stabilized under oxidizing conditions, while the cubic structure is stabilized under reducing conditions. Further, a return to a tetragonal structure can occur upon subsequent exposure of the cubic structure to oxidizing conditions. For example, the OIC/OS material has a tetragonal structure after aging at 1,150° C. for 36 hours in air, a cubic structure after subsequent aging at 1,000° C. for 1 hour in 5% hydrogen, and returns to a tetragonal structure after again aging at 1,150° C. for 36 hour in air.

This OIC/OS material is further a balance of a sufficient amount of zirconium to preferably minimize the reduction energies of $Ce^{4+}$ and the activation energy for mobility of 'O' within the lattice, a sufficient amount of cerium and niobium to provide the desired OS capacity and facile OS features. Typically, this solid solution comprises about 0.5 to about 95 mole percent (mole %) zirconium, about 0.5 to about 40 mole % cerium, about 0.5 to about 15 mole % R, about 0.5 to about 15 mole % niobium; with about 0.5 to about 90 mole % zirconium, about 0.5 to about 35 mole % cerium, and about 2 to about 12 mole % R, and 2 to about 12 mole % niobium preferred; and about 50 to about 85 mole % zirconium, about 10 to about 30 mole % cerium, about 2 to about 11 mole % R (especially yttrium), and about 2 to about 11 mole % niobium, especially preferred. It is further preferred that the Nb and R be present in substantially equivalent amounts (equimolar amounts), with equivalent amounts of Nb and R especially preferred. Particularly, for Zr-rich compositions with Zr content higher than about 50 mole %, about 1 mole % to about 11 mole % of both R and Nb are preferred to form a four-component solid solution. Such niobium-containing solid solutions crystallize in a tetragonal phase and exhibit extremely high thermal stability and resistance to sintering. No phase segregation occurs after heating at 1,200° C. in an oxidizing atmosphere. In reducing atmospheres the solid solution undergoes phase transformation into the cubic phase, which is reversible.

These OIC/OS materials show facile redox properties and higher OS capacity as characterized by TPR analysis in comparison with Zr-rich compositions of similar $CeO_2$ content. Severe aging does not deteriorate the OS characteristics in terms of temperature of reduction and OS capacity. The OIC/OS material exhibits numerous advantages over conventional OIC/OS materials. For example, due to the phase purity of the OIC/OS material, it possesses structural stability under severe three-way conversion catalyst operating conditions in contrast to current conventional materials which undergo extensive disproportionation into a mixture of phases after such thermal treatment.

The following examples are provided to further illustrate the present invention and not to limit the scope thereof.

EXAMPLES

The following examples were used to prepare OIC/OS materials comprising zirconia/ceria/yttria/niobium oxide.

Example 1

Preparation of the $Zr_{0.65}Ce_{0.25}Nb_{0.075}Y_{0.075}O_2$ Solid Solution 100 g of $ZrO(NO_3)_2$ solution (21 wt % Zr), 41.53 g of $Ce(NO_3)_3 \cdot 6H_2O$, and 11.02 g $Y(NO_3)_3 \cdot 6H_2O$ were dissolved in 500 g of deionized water to form a solution. 7.77 g of $NbCl_5$ were dissolved in 30 milliliters (mL) of a 6 molar (M) hydrogen chloride solution and then 5 mL of hydrogen peroxide ($H_2O_2$) (concentrated) was added to the solution to form a homogeneous reaction system and maintain the niobium in solution. After combining Nb-containing solution with the solution of other metals, the resulting homogeneous solution was added slowly (under vigorous stirring) to 2 liters (L) of a 3M ammonium hydroxide ($NH_4OH$) to precipitate a mixed hydrous oxide. The reaction system was additionally stirred for 3 hours. The precipitate was filtered, washed with deionized water to remove occluded ammonium chloride ($NH_4Cl$) and ammonium nitrate ($NH_4NO_3$), and then calcined at 600° C. in air for 2 hours. The calcined powder was wet milled for 30 min in a Sweco mill and then aged at 1150° C. for 36 hours in air.

XRD and surface area measurements showed that the resultant solid solution had a tetragonal crystal structure, and a surface area of 68.0 square meters per gram ($m^2/g$), when fresh, and 4.3 $m^2/g$ after aging.

Example 2

Preparation of the $Zr_{0.82}Ce_{0.08}Y_{0.05}Nb_{0.05}O_2$ Solid Solution

The same as for Example 1, using 100.0 g of $ZrO(NO_3)_2$ solution (21 wt % Zr), 9.72 g of $Ce(NO_3)_3.6H_2O$, 5.38 g $Y(NO_3)_3\ 6H_2O$ and 3.79 g of $NbCl_5$. XRD and surface area analysis showed that the resultant solid solution had a tetragonal crystal structure and surface area after aging of 5.50 $m^2/g$.

Example 3

Preparation of the $ZrO_{0.70}Ce_{0.08}Y_{0.11}Nb_{0.11}O_2$ Solid Solution The same as for Example 1, using 100.0 g of $ZrO(NO_3)_2$ solution (21 wt % Zr), 11.39 g of $Ce(NO_3)_3.6H_2O$, 13.85 g $Y(NO_3)_3\ 6H_2O$ and 9.77 g of $NbCl_5$. XRD and surface area analysis showed that the resultant solid solution had a tetragonal crystal structure and surface area after aging of 4.8 $m^2/g$.

Example 4

Preparation of the $Zr_{0.80}Ce_{0.15}Y_{0.025}Nb_{0.025}O_2$ Solid Solution The same as for Example 1, using 100.0 g of $ZrO(NO_3)_2$ solution (21 wt % Zr), 18.69 g of $Ce(NO_3)_3.6H_2O$, 2.76 g $Y(NO_3)_3\ 6H_2O$ and 1.94 g of $NbCl_5$. XRD and surface area analysis showed that the resultant solid solution had a tetragonal crystal structure and surface area after aging of 5.8 $m^2/g$.

Example 5

Preparation of the $Zr_{0.75}Ce_{0.15}Y_{0.05}Nb_{0.05}O_2$ Solid Solution

The same as for Example 1, using 100.0 g of $ZrO(NO_3)_2$ solution (21 wt % Zr), 19.94 g of $Ce(NO_3)_3.6H_2O$, 5.88 g $Y(NO_3)_3 6H_2O$ and 4.14 g of $NbCl_5$. XRD and surface area analysis showed that the resultant solid solution had a tetragonal crystal structure and surface area after aging of 5.7 $m^2/g$.

Example 6

Preparation of the $Zr_{0.70}Ce_{0.15}Y_{0.075}Nb_{0.075}O_2$ Solid Solution The same as for Example 1, using 100.0 g of $ZrO(NO_3)_2$ solution (21 wt % Zr), 21.36 g of $Ce(NO_3)_3.6H_2O$, 9.45 g $Y(NO_3)_3\ 6H_2O$ and 6.66 g of $NbCl_5$. XRD and surface area analysis showed that the resultant solid solution had a tetragonal crystal structure and surface area after aging of 5.7 $m^2/g$.

Example 7

Preparation of the $Zr_{0.65}Ce_{0.15}Y_{0.10}O_2$ Solid Solution

The same as for Example 1, using 100.0 g of $ZrO(NO_3)_2$ solution (21 wt % Zr), 23.00 g of $Ce(NO_3)_3.6H_2O$, 13.56 g $Y(NO_3)_3\ 6H_2O$ and 9.56 g of $NbCl_5$. XRD and surface area analysis showed that the resultant solid solution had a tetragonal crystal structure and surface area after aging of 4.6 $m^2/g$.

Example 8

Preparation of the $Zr_{0.55}Ce_{0.15}Y_{0.15}Nb_{0.15}O_2$ Solid Solution

The same as for Example 1, using 100.0 g of $ZrO(NO_3)_2$ solution (21 wt % Zr), 27.18 g of $Ce(NO_3)_3.6H_2O$, 24.05 g $Y(NO3)_3\ 6H_2O$ and 16.95 g of $NbCl_5$. XRD and surface area analysis showed that the resultant solid solution had a tetragonal crystal structure and surface area after aging of 3.6 $m^2/g$.

Example 9

Preparation of the $Zr_{0.65}Ce_{0.20}Y_{0.075}Nb_{0.075}O_2$ Solid Solution The same as for Example 1, using 100.0 g of $ZrO(NO_3)_2$ solution (21 wt % Zr), 30.67 g of $Ce(NO_3)_3.6H_2O$, 10.17 g $Y(NO_3)_3\ 6H_2O$ and 7.17 g of $NbCl_5$. XRD and surface area analysis showed that the resultant solid solution had a tetragonal crystal structure and surface area after aging of 4.9 $m^2/g$.

Example 10

Preparation of the $Zr_{0.725}Ce0.20Y_{0.075}Nb_{0.15}O_2$ Solid Solution

The same as for Example 1, using 100.0 g of $ZrO(NO_3)_2$ solution (21 wt % Zr), 27.50 g of $Ce(NO_3)_3.6H_2O$ and 9.12 g $Y(NO_3)_3\ 6H_2O$. XRD and surface area analysis showed that the resultant solid solution had a cubic fluorite crystal structure and surface area after aging of 3.9 $m^2/g$.

Example 11

Preparation of the $Zr_{0.80}Ce_{0.20}O_2$ oxide Product

The same as for Example 1, using 100.0 g of $ZrO(NO_3)_2$ solution (21 wt % Zr) and 24.92 g of $Ce(NO_3)_3.6H_2O$. XRD and surface area analysis showed that the resultant oxide product is a mixture of tetragonal and cubic phases. The surface area after aging is 3.4 $m^2/g$.

Example 12

Preparation of the $CeO_2$ Oxide Product

The same as for Example 1, using 100.0 g of $Ce(NO_3)_3.6H_2O$. XRD and surface area analysis showed that the resultant oxide product had a cubic fluorite crystal structure and surface area after aging of 0.4 $m^2/g$.

Example 13

Preparation of the $Nb_2O_5$ Oxide Product

The same as for Example 1 using 50.0 g of $NbCl_5$. XRD and surface area analysis showed that the resultant oxide product is a mixture of different phases. The surface area after aging is 0.6 $m^2/g$.

Example 14

Preparation of the $(ZrO_2)_{0.7}(CeO_2)_{0.2}(NbO_{2.5})_{0.10}$ Composite Oxide Mixture The same as for Example 1, using 100.0 g of $ZrO(NO_3)_2$ solution (21 wt % Zr), 28.48 g of $Ce(NO_3)_3 \cdot 6H_2O$ and 8.88 g $NbCl_5$. XRD and surface area analysis showed that the oxide product is a mixture of different phases. The surface area after aging is 1.2 $m^2/g$.

Example 15

Preparation of the $(ZrO_2)_{0.07}(YO_{1.5})_{0.15}(NbO_{2.5})_{0.15}$ Composite Oxide Mixture The same as for Example 1, using 100.0 g of $ZrO(NO_3)_2$ solution (21 wt % Zr), 18.89 g of $Y(NO_3)_3 \cdot 6H_2O$ and 13.32 g $NbCl_5$. XRD and surface area analysis showed that the resultant oxide product is a mixture of different phases. The surface area after aging is 0.7 $m^2/g$.

Figure 6:
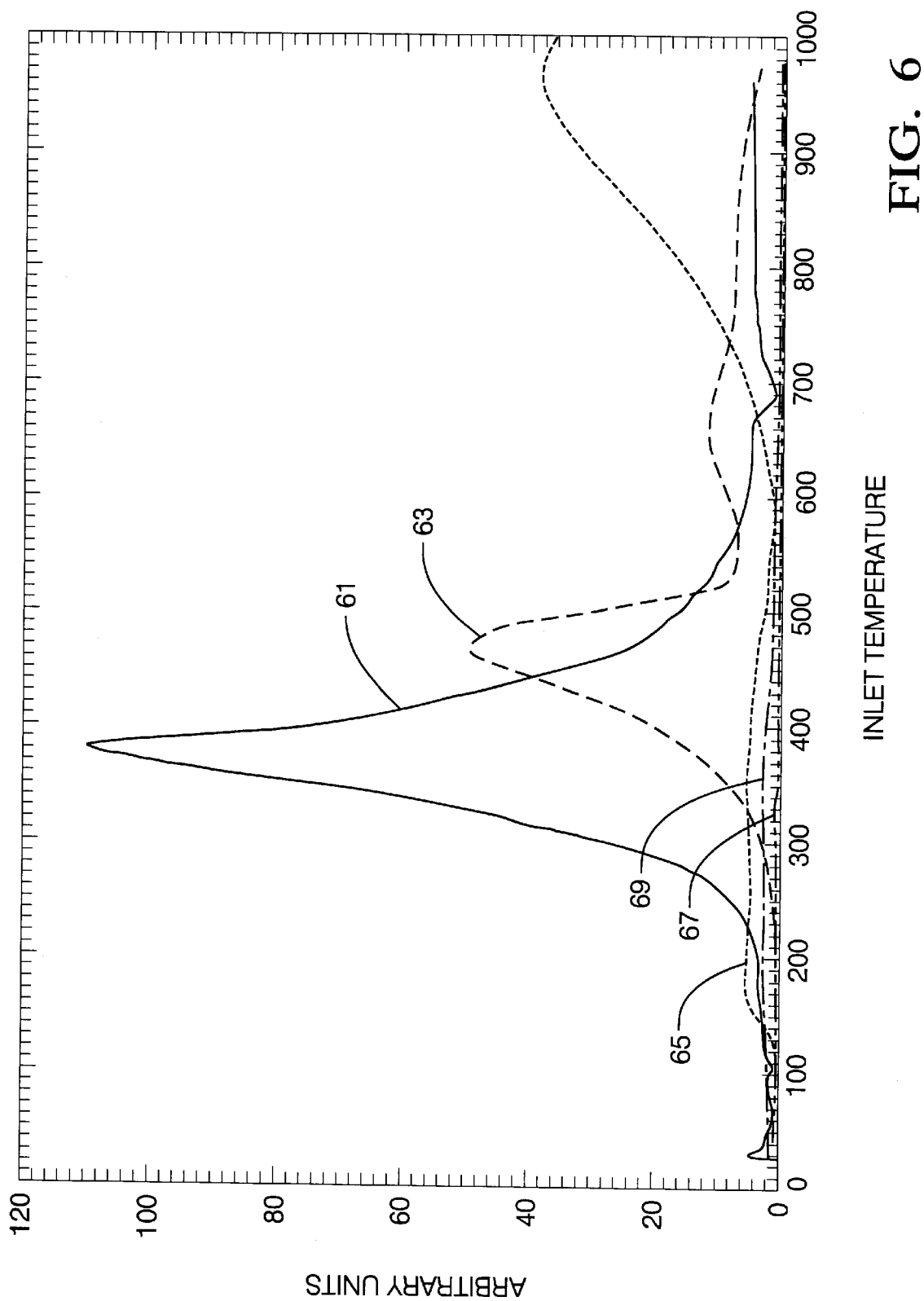
FIG. 6 is a graphical representation comparing the redox activity of $Nb_2O_5$ (line 67), $CeO_2$ (line 65), $(ZrO_2)_{0.7}(CeO_2)_{0.2}(NbO_{2.5})_{0.1}$ composite oxide (line 63), a $(ZrO_2)(YO_{1.5})_{0.15}(NbO_{2.5})_{0.15}$ (line 69) composite oxide, and one embodiment of a composition of the present invention, $(Zr_{0.65}Ce_{0.2}Y_{0.075}Nb_{0.075}O_2$; line 61), after aging at 1,150° C. for 36 hours in air showing much enhanced redox properties for the inventive material relative to the oxides of the individual components or sub-mixtures of the oxides of the individual components.
Figure 7:
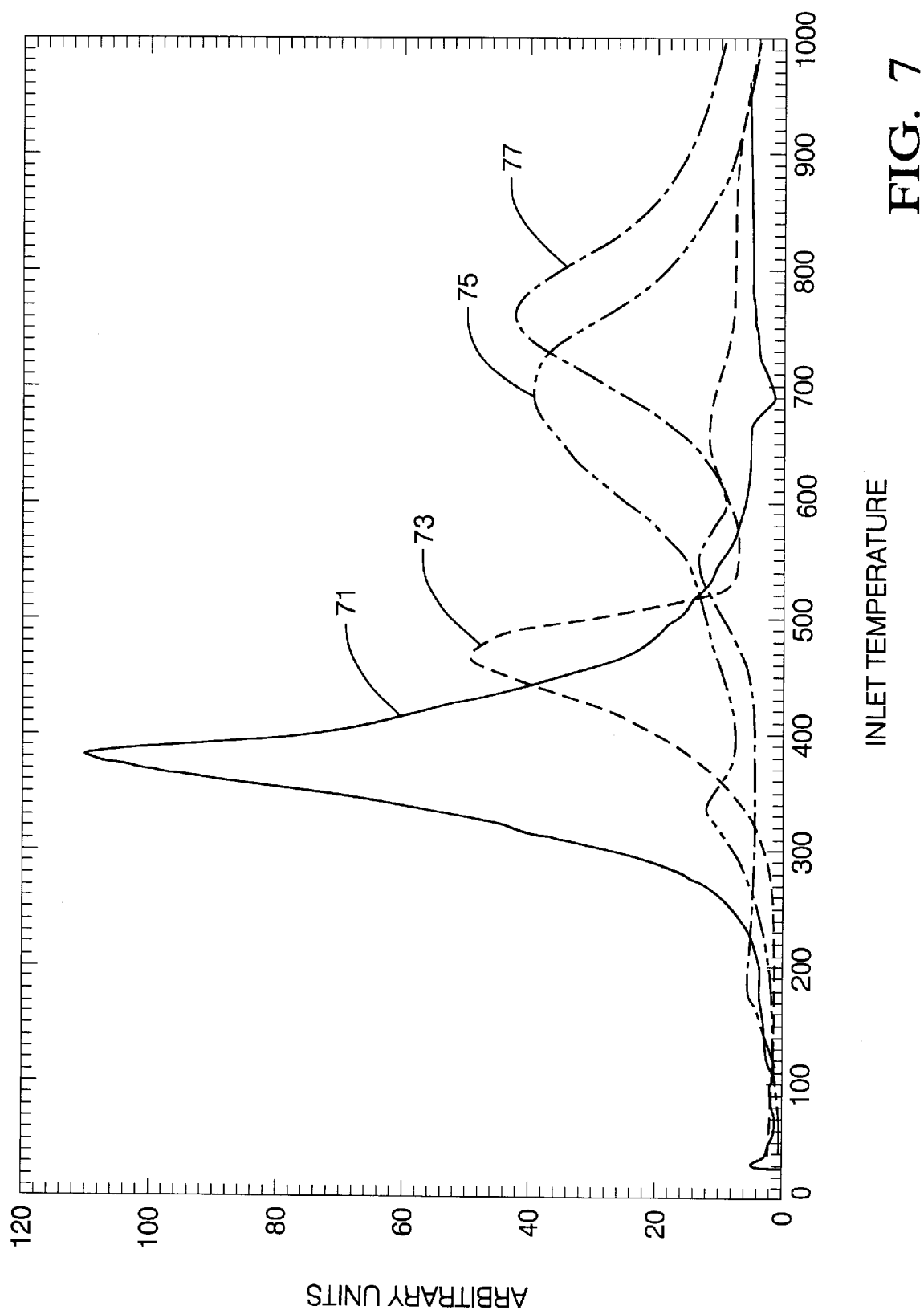
FIG. 7 is a graphical representation illustrating the OS capacity characteristics and retention of capacity of one embodiment $(Zr_{0.65}Ce_{0.2}Y_{0.075}Nb_{0.075}O_2$; line 71) of the OIC/OS material of the present invention. It is compared to different sub-mixtures of solid solutions or composite oxide mixtures of the individual components $(Zr_{0.80}Ce_{0.20}O_2$ (line 77), $Zr_{0.725}Ce_{0.20}Y_{0.075}O_{1.9625}$ (line 75), and a $(ZrO_2)_{0.7}(CeO_2)_{0.2}(NbO_{2.5})_{0.10}$ (line 73)) all of which have been aged at 1,150° C. for 36 hours in air. The inventive material of the current invention shows much enhanced redox properties relative to the different compositions of the individual components.

Referring to FIGS. 6 and 7 are compared the redox activity characteristics of $Nb_2O_5$, $CeO_2$, $ZrO_2/Y_2O_3/Nb_2O_5$, $Zr_{0.80}Ce_{0.2}O_2$, $Zr_{0.725}Ce_{0.2}Y_{0.075}O_{1.9625}$ and $(ZrO_2)_{0.7}(CeO_2)_{0.2}(NbO_{2.5})_{0.10}$ and $Zr_{0.65}Ce_{0.2}Y_{0.075}Nb_{0.075}O_2$. It is seen that the present composition has much enhanced redox properties compared to the redox properties of the individual oxides or various mixtures of the component oxides. This is further demonstrated in Table 1 below where the maxima in the reduction temperatures are recorded as well as the total observed $H_2$ uptake and the $H_2$ uptake predicted for Ce reduction only.

TABLE 1

Hydrogen TPR Characterization (mMole $H_2/g$)

| Material | $H_2$ TPR Peak Position, °C. | $H_2$ Uptake, MMol $H_2/g$ | Theoretical $H_2$ Uptake due to $Ce^{IV}/Ce^{III}$ mMol $H_2/g$ |
|---|---|---|---|
| $Zr_{0.65}Ce_{0.20}Y_{0.075}Nb_{0.075}O_2$ | 345 | 1.19 | 0.75 |
| $Nb_2O_5$ | >1,000 | 0 | 0 |
| $CeO_2$ | 970 | <0.5 | 2.91 |
| $(ZrO_2)_{0.7}(YO_{1.5})_{0.15}(NbO_{2.5})_{0.15}$ | >1,000 | 0 | 0 |
| $(ZrO_2)_{0.7}(CeO_2)_{0.2}(NbO_{2.5})_{0.10}$ | 475 | 0.65 | 0.75 |
| $Zr_{0.80}Ce_{0.20}O_2$ | 770 | 0.70 | 0.75 |
| $Zr_{0.725}Ce_{0.20}Y_{0.075}O_{2-x}$ | 680 | 0.75 | 0.76 |

It is seen that for the present composition, $H_2$ uptake occurs at the lowest temperature (i.e., below about 400° C., and even below about 350° C.), and that the $H_2$ uptake is greater than that predicted based on the amount of Ce present (e.g., an improvement of greater than 25%, and even greater than about upon the theoretical uptake due to ceria and also better than the conventional composition $(Zr_{0.725}Ce_{0.20}Y_{0.075}O_{2-x})$; i.e., a $H_2$ uptake exceeding about 1.00 mMol $H_2/g$, with greater than about 1.15 mMol $H_2/g$ readily attainable). This shows that Nb in the present composition is also undergoing reduction, that its reduction is coupled to that of $CeO_2$, and that both reductions occur at lower temperatures than would be predicted if they were not present together in the solid solution. This is demonstrated, for example, from a comparison of the reduction temperatures and amounts of $H_2$ uptake for pure $Nb_2O_5$ and the $Zr,CeO_x$ or $Zr,Ce,YO_x$ compositions. The latter materials show much lower amounts of $H_2$ uptake and reduction occurs at significantly higher temperatures showing that they have clearly lower oxygen storage capacity and much less facile reduction features.

In Table 2 are summarized the TPR data for a range of compositions having the general empirical formula: $Zr_xCe_y Nb_zY_zO_2$ where x is 0.55 to 0.82; y is 0.08 to 0.25; and z is 0.025 to 0.15. The temperature at which the maximum rate of reduction occurs for all samples is below 400° C. and the OSC values are much higher than those predicted for ceria assuming that only Ce is redox active. Analysis of several compositions of varying Nb content shows that when the Nb concentration is lower than 10 mole %, the $Nb^{5+}/Nb^{3+}$ redox reaction takes place. This explains the higher than expected OS capacity values for the compositions in Table 2. These oxygen storage capacity values are much higher (delta OSC) than those observed for binary $CeO_2/ZrO_2$ solid solutions with the same cerium content.

TABLE 2

Hydrogen TPR Characterization (mMole $H_2/g$)

| Composition | OSC- Ce $Ce^{4+}/Ce^{3+}$ | OSC-I $Ce^{4+}/Ce^{3+}$ + $Nb^{5+}/Nb^{4+}$ | OSC-II $Ce^{4+}/Ce^{3+}$ + $Nb^{5+}/Nb^{3+}$ | OSC observed |
|---|---|---|---|---|
| $Zr_{0.82}Ce_{0.08}Y_{0.05}Nb_{0.05}O_2$ | 0.32 | 0.51 | 0.71 | 0.64 |
| $Zr_{0.7}Ce_{0.08}Y_{0.11}Nb_{0.11}O_2$ | 0.32 | 0.75 | 1.18 | 0.58 |
| $Zr_{0.80}Ce_{0.15}Y_{0.025}Nb_{0.025}O_2$ | 0.58 | 0.67 | 0.77 | 0.70 |
| $Zr_{0.75}Ce_{0.15}Y_{0.05}Nb_{0.05}O_2$ | 0.58 | 0.77 | 0.96 | 0.80 |
| $Zr_{0.70}Ce_{0.15}Y_{0.075}Nb_{0.075}O_2$ | 0.58 | 0.86 | 1.15 | 1.02 |
| $Zr_{0.65}Ce_{0.15}Y_{0.10}Nb_{0.10}O_2$ | 0.58 | 0.96 | 1.34 | 0.90 |
| $Zr_{0.55}Ce_{0.15}Y_{0.15}Nb_{0.15}O_2$ | 0.58 | 1.15 | 1.73 | 0.75 |
| $Zr_{0.65}Ce_{0.20}Y_{0.075}Nb_{0.075}O_2$ | 0.75 | 1.04 | 1.32 | 1.19 |
| $Zr_{0.6}Ce_{0.25}Y_{0.075}Nb_{0.075}O_2$ | 0.92 | 1.20 | 1.48 | 1.10 |

Figure 8:
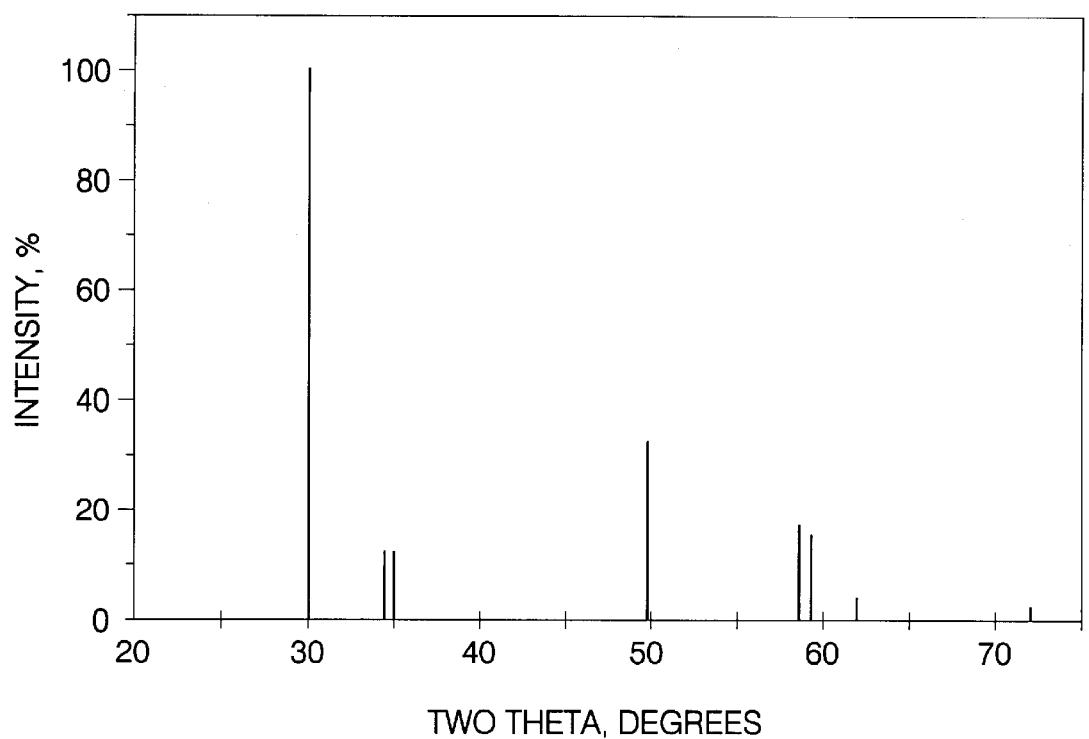
FIG. 8 is an XRD pattern of one composition of the instant invention $(Zr_{0.65}Ce_{0.2}Y_{0.075}Nb_{0.075}O_2)$ after aging at 1,150° C. for 36 hours in air showing a single phase tetragonal crystal structure with no evidence of phases associated with the individual component oxides or sub-mixtures of solid solutions of the individual components.
Figure 9:
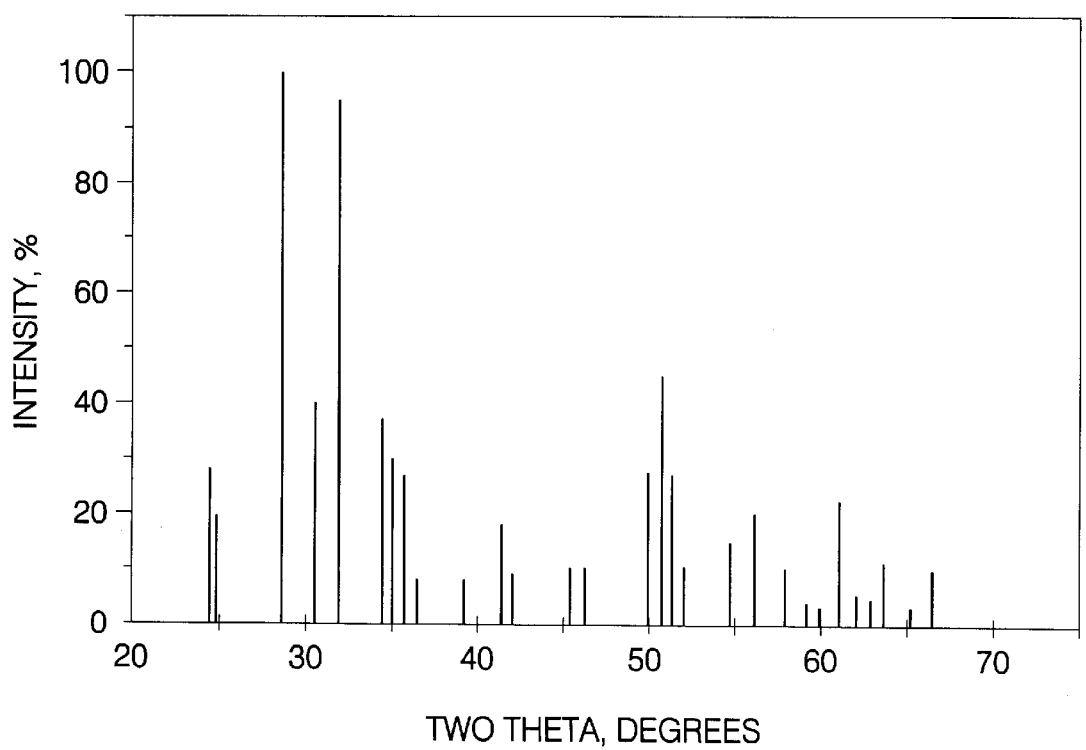
FIG. 9 is an example of an XRD pattern for a composite oxide of the composition, $(ZrO_2)_{0.7}(YO_{1.5})_{0.15}(NbO_{2.5})_{0.15}$, after aging at 1,150° C. for 36 hours in air, showing that these sub-oxide mixtures do not form single phase materials but instead composite mixed oxide phases.
Figure 10:
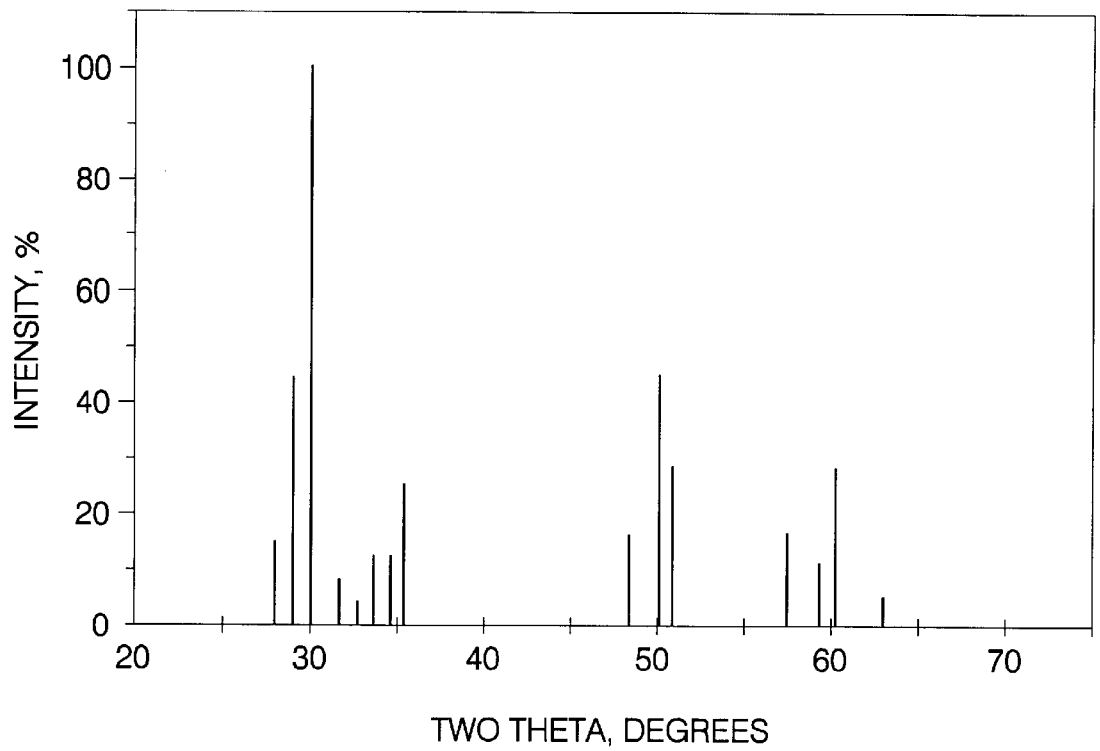
FIG. 10 is another example of an XRD pattern for a composite oxide of the composition $(ZrO_2)_{0.7}(CeO_2)_{0.2}(NbO_{2.5})_{0.5}$ after aging at 1,1500° C. for 36 hours in air showing that these sub-oxide mixtures do not form single phase materials but instead composite mixed oxide phases.
Figure 11:
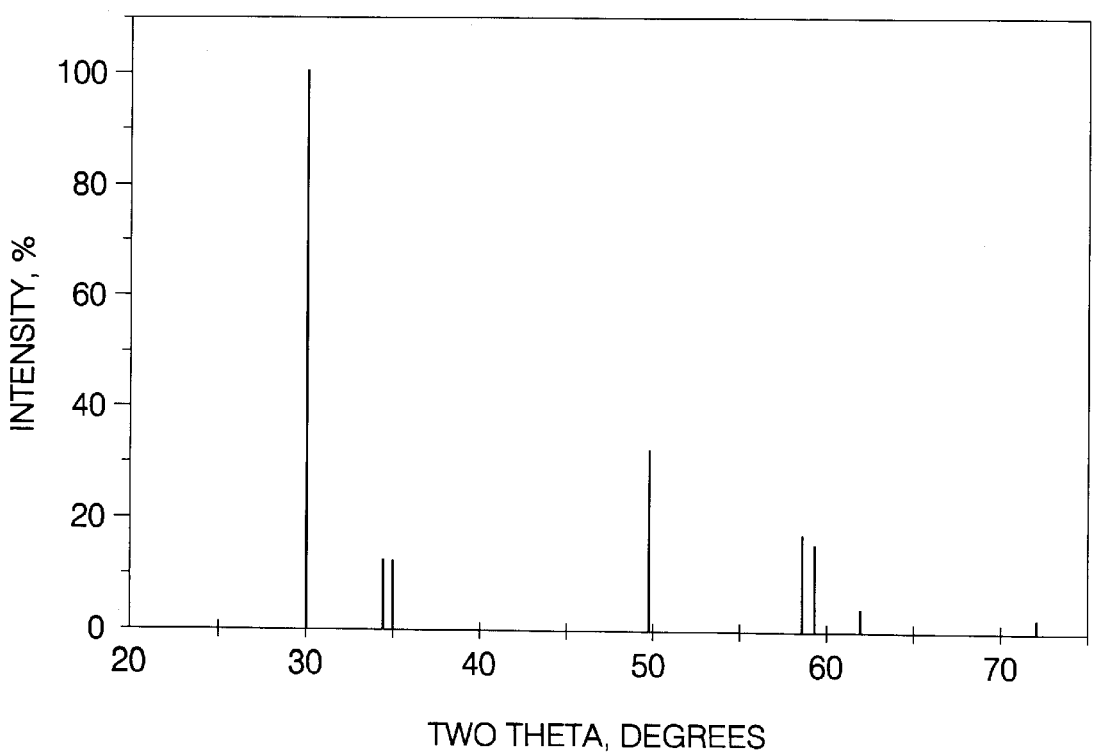
FIGS. 11—13 are XRD patterns for a zirconium/cerium/yttrium/niobium solid solution, comprising 65 mole % zirconia, 20 mole % ceria, 7.5 mole % yttria, and 7.5 mole % niobium after aging consecutively under oxidizing conditions (1,150° C./36 hrs/air) in reducing conditions (1,000° C./1 hr in $5\%H_2/95\%Ar$) and then again in oxidizing conditions (1150° C./36 hrs/air) illustrating the full reversibility of the tetragonal-cubic-tetragonal phases upon cycling between oxidizing-reducing-oxidizing conditions.
Figure 12:
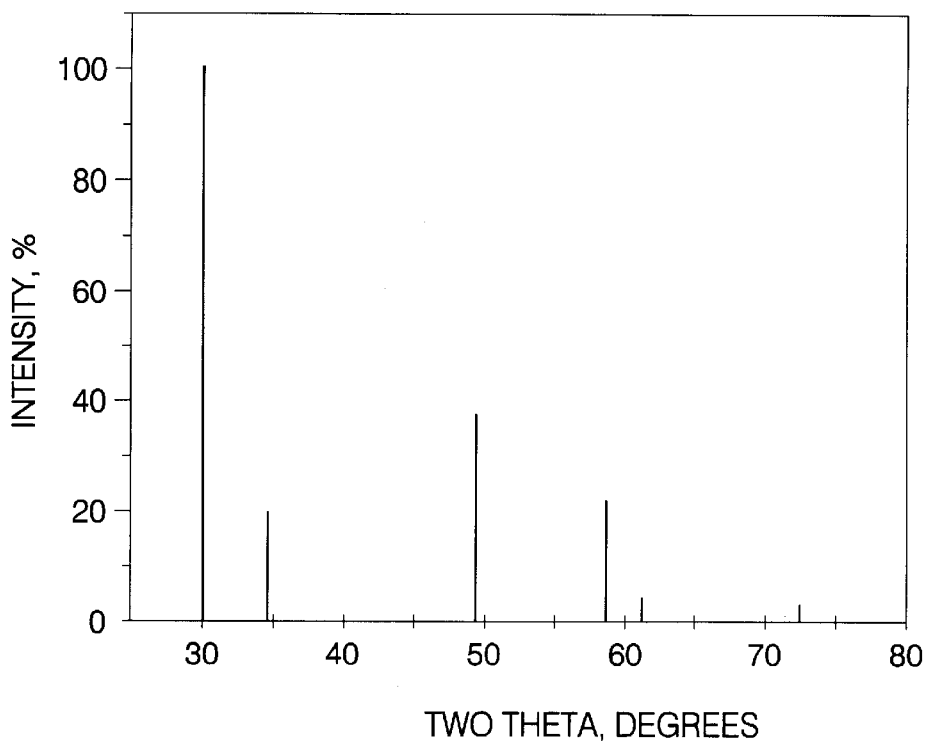
Figure 13:
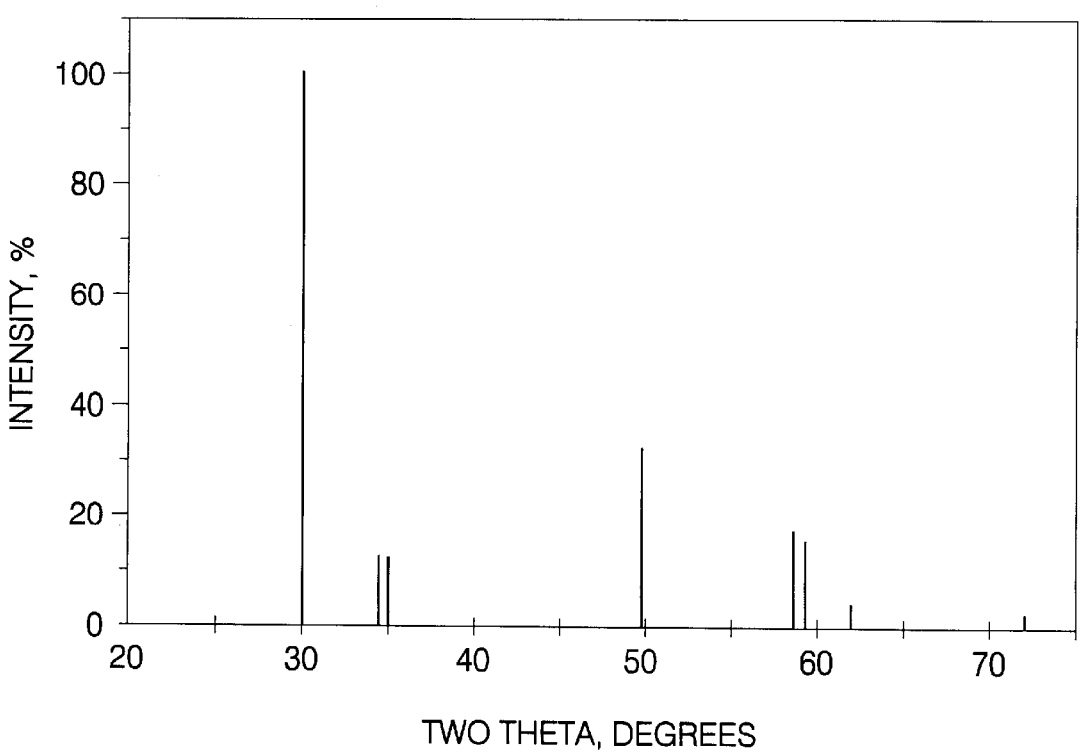

FIG. 8 is a typical X-ray diffraction (XRD) pattern of various compositions ($Zr_{0.65}Ce_{0.2}Y_{0.075}Nb_{0.075}O_2$) showing diffraction peaks that correspond to the presence of a single tetragonal phase. Diffraction peaks associated with the individual oxide components or mixtures of the individual oxide components or sub-mixtures of solid solutions are not observed showing that all the component elements have combined to form a single crystalline phase. In FIGS. 9 and 10 are shown XRD patterns of varying composite oxides for different combinations of the individual components that make up the composition of the instant invention ($ZrO_2/Y_2O_3/Nb_2O_5$ and $ZrO_2/CeO_2/Nb_2O_5$) after aging at 1150° C. for 36 hours in air. It is seen that mixed phases of the individual components are observed showing that a single phase was not formed for any of the mixtures as occurs for the full composition of the current invention. In FIGS. 11–13 are shown XRD patterns for the $Zr_{0.65}Ce_{0.2}Y_{0.075}Nb_{0.075}O_2$ composition after aging consecutively under oxidizing conditions (1,150° C./36 hours in air; FIG. 11), in reducing conditions (1,000° C./1 hr in 5%$H_2$/95%Ar; FIG. 12) and then again in oxidizing conditions (1,150° C./36 hrs in air; FIG. 13) illustrating the full reversibility of the tetragonal-cubic-tetragonal phases upon cycling between oxidizing—reducing—oxidizing conditions. This complete reversibility in the cycling between the tetragonal and cubic phases upon cycling between oxidizing and reducing conditions is completely unexpected and is one of the characteristics of the composition.

Figure 14:
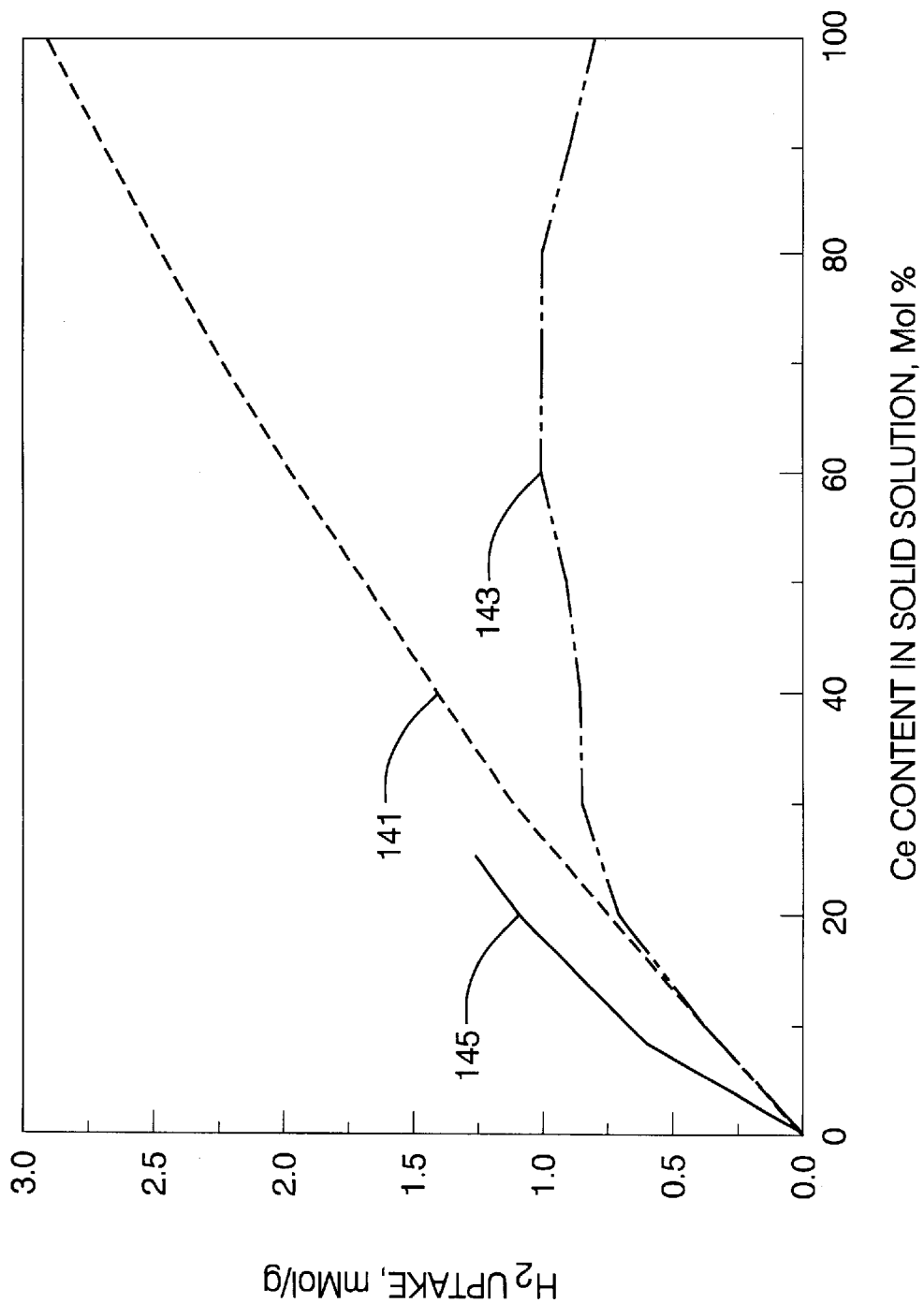
FIG. 14 illustrates the beneficial impact on the OS capacity of Zr-rich compositions (30 mole % Ce present) for adding niobium to the crystal structure.

Finally, referring to FIG. 14, the benefit of incorporating Nb on the total oxygen storage capacity is illustrated, where line 141 is theoretical oxygen storage capacity, line 143 is oxygen storage capacity after aging at 1,150° C. for 36 hours in air, and line 145 is oxygen storage capacity for Nb containing solid solutions. It is seen that for the high Zr-content solid solutions, Nb enhances significantly the aged oxygen storage characteristics, both oxygen storage capacity and increased facile nature of the oxygen storage.

Another potential advantage of doping Zr-rich solid solutions with Nb is a substantial increase in their resistance sulfur poisoning through formation of inert sulfates. It is believed that, substitution of ceria, which has basic properties and behaves as an excellent adsorbent for sulfur dioxide, for acidic niobium oxide ($Nb_2O_5$) should suppress sulfur dioxide absorption of these solid solutions.

It should be further noted that due to the enhanced phase stability and oxygen ion conducting properties of these OIC/OS materials, they can be employed in numerous other applications, including: in solid oxide fuel cells (SOFC) for energy conversion, in electrochemical oxygen sensors, in oxygen ion pumps, structural ceramics of high toughness, in heating elements, in electrochemical reactors, in steam electrolysis cells, in electrochromic materials, in magnetohydrodynamic (MHD) generators, in hydrogen sensors, in catalysts for methanol decomposition, as potential hosts for immobilizing nuclear waste, as oxygen sensors when used with three-way-conversion (TWC) catalysts, as well as in other applications where oxygen storage capacity and/or oxygen ion conductivity are factors. When used as oxygen storage materials in three-way-conversion catalysts, for example, the OICIOS material would be supported on a substrate as part of the three-way-conversion catalyst (e.g., precious metals, such as platinum, palladium, iridium, osmium, rhodium, ruthenium, a high surface area porous support such as a high surface area alumina, as well as other metals and metal oxides, and combinations comprising at least one of the foregoing). When exposed to an exhaust environment, this combined material would exhibit substantially equal or increased three-way-conversion capabilities compared to a conventional catalyst having a higher catalyst (e.g. metal) loading, and substantially equal capabilities compared to a conventional catalyst having a higher cerium content.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

We claim:

1. A catalyst, comprising:
   an OIC/OS material having about 0.5 to about 95 mole % zirconium, about 0.5 to about 40 mole % cerium, about 0.5 to about 15 mole % R, wherein R is selected from the group consisting of rare earth metal(s), alkaline earth metal(s), and combinations comprising at least one of the foregoing, and about 0.5 to about 15 mole % niobium, based upon 100 mole % metal component in the material;
   precious metal; and
   a porous support;
   wherein said zirconium, cerium, R, niobium, precious metal and porous support are deposited on a substrate.

2. A catalyst as in claim 1, wherein said R and said niobium are present in substantially equimolar amounts.

3. A catalyst as in claim 1, wherein R is selected from the group consisting of yttrium, magnesiam, calcium strontium, lauthanum, praseodymium, neodymium, and combinations comprising at least one of the foregoing metals.

4. A catalyst as in claim 3, wherein said OIC/OS material further comprises about 0.5 to about 90 mole % zirconium; about 0.5 to about 35 mole % cerium; about 1 to about 12 mole % R; and about 1 to about 12 mole % niobium.

5. A catalyst as in claim 4, wherein said OIC/OS material further comprises about 50 to about 85 mole % zirconium; about 10 to about 30 mole % cerium; about 2 to about 11 mole % R, and about 2 to about 11 mole % niobium.

6. A catalyst as in claim 1, wherein the precious metal is selected from the group consisting of platinum, palladium, iridium, osmium, rhodium, ruthenium, and mixtures comprising one or more of the foregoing precious metals.

7. A catalyst as in claim 1, wherein the OIC/OS material further has a substantially pure cubic crystal structure under reducing conditions, and a substantially pure tetragonal crystal structure under oxidizing conditions.

* * * * *